(12) United States Patent
Park et al.

(10) Patent No.: US 12,496,273 B2
(45) Date of Patent: Dec. 16, 2025

(54) HYDROGEL AND METHOD FOR PREPARING THE SAME

(71) Applicant: KOREA ATOMIC ENERGY RESEARCH INSTITUTE, Daejeon (KR)

(72) Inventors: Sang-Hyun Park, Seoul (KR); Muhammad Asim Raza, Jeongeup-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 413 days.

(21) Appl. No.: 17/797,470

(22) PCT Filed: Feb. 3, 2021

(86) PCT No.: PCT/KR2021/001419
§ 371 (c)(1),
(2) Date: Aug. 4, 2022

(87) PCT Pub. No.: WO2021/158013
PCT Pub. Date: Aug. 12, 2021

(65) Prior Publication Data
US 2023/0022419 A1    Jan. 26, 2023

(30) Foreign Application Priority Data

Feb. 4, 2020 (KR) .......... 10-2020-0013090
Jan. 26, 2021 (KR) .......... 10-2021-0010992

(51) Int. Cl.
| | | |
|---|---|---|
| *A61K 41/17* | (2020.01) | |
| *A61K 9/06* | (2006.01) | |
| *A61K 31/43* | (2006.01) | |
| *A61K 31/7036* | (2006.01) | |
| *A61K 47/24* | (2006.01) | |
| *A61K 47/32* | (2006.01) | |
| *A61K 47/36* | (2006.01) | |
| *A61K 51/06* | (2006.01) | |

(52) U.S. Cl.
CPC .......... *A61K 9/06* (2013.01); *A61K 31/43* (2013.01); *A61K 31/7036* (2013.01); *A61K 41/17* (2020.01); *A61K 47/24* (2013.01); *A61K 47/32* (2013.01); *A61K 47/36* (2013.01); *A61K 51/06* (2013.01)

(58) Field of Classification Search
CPC ...... A61K 9/06; A61K 31/43; A61K 31/7036; A61K 41/17; A61K 47/24; A61K 47/32; A61K 47/36; A61K 51/06; A61K 9/0024
See application file for complete search history.

(56) References Cited

U.S. PATENT DOCUMENTS

| | | | | |
|---|---|---|---|---|
| 2005/0113773 | A1* | 5/2005 | Yoshii | C08B 37/003 604/367 |
| 2007/0122333 | A1* | 5/2007 | Yang | B01J 20/2808 423/335 |
| 2019/0388517 | A1* | 12/2019 | Qiu | A61L 27/52 |

FOREIGN PATENT DOCUMENTS

| | | | | |
|---|---|---|---|---|
| CA | 2835650 A1 | * | 11/2012 | .......... A01N 59/16 |
| KR | 10-2010-0030324 | | 3/2010 | |
| KR | 10-2013-0133692 | | 12/2013 | |
| KR | 10-1670249 | | 10/2016 | |
| KR | 10-1985368 | | 9/2019 | |
| WO | 2015/021303 | | 2/2015 | |
| WO | WO-2017184881 A1 | * | 10/2017 | .......... A61F 9/0017 |

OTHER PUBLICATIONS

Sadaf Hafeez et al. (γ-Irradiated chitosan based injectable hydrogels for controlled release of drug (Montelukast sodium). International Journal of Biological Macromolecules. 114. 2018. pp. 890-897 (Year: 2018).*
Lee-Young Lim et al. (Gamma Irradiation of Chitosan. Journal of biomedical materials Research. 43. 1998. pp. 282-290 (Year: 1998).*
Salimeh Gharazi et al. Nature Inspired Hydrogels with Soft and Stiff Zones that Exhibit a 100-Fold Difference in Elastic Modulus, Applied Materials and Interfaces. 2018. 34664-34673 (Year: 2018).*
Hafeez (γ-Irradiated chitosan based injectable hydrogels for controlled release of drug (Montelukast sodium). International Journal of Biological Macromolecules. 114. 2018. pp. 890-897.) (Year: 2018).*
Sami (Formulation of novel chitosan guar gum based hydrogels for sustained drug release of paracetamol. International Journal of Biological Macromolecules. 2018.) (Year: 2018).*
Lim (Gamma Irradiation of Chitosan. Journal of biomedical materials Research. 43. 1998. pp. 282-290). (Year: 1998).*
Sadaf Hafeez et al., "γ-Irradiated chitosan based injectable hydrogels for controlled release of drug(Monte lukast sodium)", International Journal of Biological Macromolecules, Jul. 2018, vol. 114, pp. 890-897.
Nafisa Gull et al., "In vitro study of chitosan-based multi-responsive hydrogels as drug release vehicles: a preclinical study", RSC Advances, Sep. 2019, vol. 9, pp. 31078-31091.
Jae-Woon Shim et al., "Preparation of Poly(acrylic acid)-chitosan hydrogels by gamma irradiation and in vitro drug release", Journal of Applied Polymer Science, Oct. 2003, vol. 90, pp. 3660-3667.

(Continued)

*Primary Examiner* — Jake M Vu
*Assistant Examiner* — Samantha L Mejias
(74) *Attorney, Agent, or Firm* — LEX IP MEISTER, PLLC (57) ABSTRACT

The present disclosure provides a hydrogel having excellent drug delivery ability and having antibacterial properties as well as pH-dependent, biocompatible and biodegradable properties, and a method for preparing the same. The hydrogel including radiated chitosan, a natural gelling polymer, a hydrophilic synthetic polymer and (3-mercaptopropyl) trimethoxysilane (MPTMS), and the method for preparing the same are provided.

7 Claims, 9 Drawing Sheets

(56) References Cited

OTHER PUBLICATIONS

Kyoung Ran Park et al., "Preparation and Characterization of Poly(vinyl alcohol)/Poly(N-vinylpyrrolidone)/Glycerin/Chitosan Hydrogels by Radiation", Polymer(Korea), Nov. 2002, vol. 26, No. 6, pp. 792-802.
Eun Kyoung Choi et al., "Preparation and Characterization of PVAL/PVP/Hexylene Glycol/Chitosan Hydrogels by γ-Ray", Polymer(Korea), Jul. 2003, vol. 27, No. 4, pp. 349-357.

* cited by examiner

HYDROGEL AND METHOD FOR PREPARING THE SAME

TECHNICAL FIELD

The present disclosure relates to a hydrogel having excellent drug delivery ability and a method for preparing the same.

BACKGROUND ART

A drug delivery system is a dosage method designed to efficiently deliver a required amount of drugs to minimize the side effects of existing drugs and maximize the efficacy and effects of drugs. In such a drug delivery system, biocompatible and/or biodegradable hydrogels that may be injected into the body have been developed for efficient drug delivery of macromolecules such as proteins, genes and the like. Such hydrogels are formed through the chemical and/or physical crosslinking of polymers, and some crosslinking agents are used for chemical bonding.

In addition, hydrogel is one of the materials attracting attention in that it has a high moisture content and may be applied to various fields by controlling chemical and/or physical properties. In particular, because hydrogel may be used for bone, cartilage, skin regeneration, drug delivery, wound treatment and the like by controlling the biocompatibility of the hydrogel, the demand for application thereof to tissue regeneration and cell therapy is increasing further.

For example, as in Korean Patent Registration No. 1985368, a hydrogel having wettability is being studied, and the demand for technology development for a hydrogel having excellent wettability and biocompatibility is continuously increasing.

DISCLOSURE

Technical Problem

An aspect of the present disclosure is to provide a hydrogel having excellent drug delivery ability and having antibacterial properties as well as pH-dependent, biocompatible and biodegradable properties, and a method for preparing the same.

Technical Solution

According to an aspect of the present disclosure, a hydrogel includes radiated chitosan, a natural gelling polymer, a hydrophilic synthetic polymer, and (3-mercaptopropyl) trimethoxysilane (MPTMS).

According to another aspect of the present disclosure, a method for preparing a hydrogel includes irradiating chitosan with radiation; mixing radiated chitosan, a natural gelling polymer, and a hydrophilic synthetic polymer with a solvent; and adding (3-mercaptopropyl)trimethoxysilane (MPTMS) to the solvent.

Advantageous Effects

According to an exemplary embodiment, a hydrogel having excellent drug delivery ability, swelling properties, thermal stability, biodegradability, biocompatibility and antibacterial properties may be provided, and thus, the hydrogel according to an exemplary embodiment may be usefully applied even when a radioactive drug having physiological activity such as a radioactive peptide and/or protein needs to maintain stability in vivo.

BEST MODE

Hereinafter, exemplary embodiments of the present disclosure will be described with reference to the accompanying drawings. However, embodiments of the present disclosure may be modified in various other forms, and the scope of the present disclosure is not limited to the embodiments described below.

The present disclosure provides a hydrogel having excellent drug delivery ability, swelling properties, thermal stability, biodegradability, biocompatibility and antibacterial properties.

In detail, the present disclosure provides a hydrogel comprising radiated chitosan, a natural gelling polymer, a hydrophilic synthetic polymer, and (3-mercaptopropyl) trimethoxysilane (MPTMS).

In general, chitosan has a very large molecular weight (about 300 to 1000 kDa), and thus, solubility thereof in a solvent such as water is very low, and viscosity thereof is high. On the other hand, rather than the case of having a low viscosity and high solubility, since properties such as superior physicochemical advantages, antibacterial properties, antitumor properties and antifungal properties may be obtained, it is necessary to lower the molecular weight of chitosan.

As a method of lowering the molecular weight of chitosan, methods such as oxidative decomposition, acid hydrolysis, enzymatic decomposition, and the like known in the art may be used, but according to an exemplary embodiment, the molecular weight of chitosan may be lowered by irradiation of radiation. This method is effective in terms of costs, safe, less toxic and environmentally friendly. In detail, as the radiation, radiation such as X-ray, gamma ray, or electron ray may be used.

The backbone of chitosan has 1-4 glycosidic bonds, and the C—H and C—OH bonds of chitosan are broken by irradiation, which may lower the molecular weight of chitosan. Thus, irradiation reduces the molecular weight of a polymer by cleaving the bonds within the chemical structure of chitosan.

Accordingly, the weight average molecular weight of chitosan in general may be about $31.00 \times 10^4$ to $37.5 \times 10^4$, but the weight average molecular weight of chitosan irradiated with radiation according to an embodiment of the present disclosure may be $19.00 \times 10^4$ to $21.50 \times 10^4$, and preferably, may be $19.50 \times 10^4$ to $21.00 \times 10^4$. If the weight average molecular weight of chitosan irradiated with radiation is less than $19.50 \times 10^4$, problems related to mechanical properties, physiochemical characteristics, crystallinity, and contact angle may occur. If the weight average molecular weight thereof exceeds $21.50 \times 10^4$, the viscosity increases and the solubility is low, and the drug delivery ability (drug release ability) may be significantly reduced.

Furthermore, in the present disclosure, as a polymer capable of producing a hydrogel, a natural gelling polymer may be used. However, the case of natural gelling polymers have limitations in manufacturing a hydrogel using only natural gelling polymers due to unwanted weak mechanical strength. Therefore, in the present disclosure, not only natural gelling polymers but also synthetic polymers may be used.

For example, in an embodiment of the present disclosure, as the natural gelling polymer, a natural gelling polymer including at least one selected from the group consisting of galactomannan, glucomannan, guar gum, locust bean gum, pluronic, agar, algin, carrageenan gum, xanthan gum, tamarind gum, tara gum, karaya gum, and gellan gum may be used, but is not limited thereto.

Furthermore, in an exemplary embodiment of the present disclosure, as the synthetic polymer, a hydrophilic synthetic polymer may be used. For example, the hydrophilic synthetic polymer may be a synthetic polymer including at least one selected from the group consisting of polyvinyl alcohol, polyacrylate, polyvinylpyrrolidone and polyethylene glycol, but is not limited thereto.

On the other hand, the hydrogel for drug delivery according to an embodiment of the present disclosure may include, for example, based on the total weight of the hydrogel, 40 to 80 wt % of the radiated chitosan, 5 to 15 wt % of the natural gelling polymer, 3 to 10 wt % of the hydrophilic synthetic polymer, and 10 to 45 wt % of the (3-mercaptopropyl) trimethoxysilane, and in detail, may include 45 to 75 wt % of radiated chitosan, 8 to 13 wt % of the natural gelling polymer, 4 to 8 wt % of the hydrophilic synthetic polymer, and 10 to 45 wt % of (3-mercaptopropyl)trimethoxysilane.

In the present specification, the hydrogel according to an embodiment of the present disclosure may be abbreviated and described, and for example, the hydrogel containing radiated chitosan, guar gum and PVP, according to an embodiment of the present disclosure, may be referred to as "RCGP".

In detail, based on the total weight of the hydrogel, the content of radiated chitosan may be 40 to 80 wt %, for example, 45 to 70 wt %, in detail, 45 to 65 wt %, and if the content of the radiated chitosan is less than 40 wt %, problems may arise with respect to mechanical properties, physiochemical characteristics, crystallinity, and contact angle, and if the content thereof exceeds 80 wt %, a problem in which the viscosity is relatively high and the solubility is relatively low and the drug delivery ability (drug release ability) may thus be significantly reduced may occur.

In addition, based on the total weight of the hydrogel, the content of the natural gelling polymer may be 5 to 15 wt %, in detail, 8 to 13 wt %, and if the content of the natural gelling polymer is less than 5 wt %, since the viscosity thereof is relatively high and the solubility thereof is relatively low, there may be a problem in which the drug delivery ability (drug release ability) is significantly reduced, and if the content thereof exceeds 15 wt %, the hydrogel properties may be weakened.

Further, based on the total weight of the hydrogel, the content of the hydrophilic synthetic polymer may be 3 to 10 wt %, in detail, 4 to 6 wt %, and if the content of the hydrophilic synthetic polymer is less than 3 wt %, a problem in which physicochemical properties deteriorates may occur, and if the content thereof exceeds 10 wt %, a problem of deterioration in toughness of the hydrogel may occur.

On the other hand, a hydrogel according to an embodiment of the present disclosure may include (3-mercaptopropyl) trimethoxysilane (MPTMS), which may serve as a crosslinking agent, and the use of such a component may improve the swellability of the hydrogel, to obtain properties suitable for drug delivery.

MPTMS is a non-toxic organosilane and may improve crosslinking and chemical modification ability of the chitosan, a natural gelling polymer and a hydrophilic synthetic polymer.

The hydrogel according to an embodiment of the present disclosure may include 10% to 45 wt % of the MPTMS, based on the total weight of the hydrogel, in detail, 20 to 40 wt % of the MPTMS. If MPTMS is added in an amount of less than 10 wt %, there is a problem in which the swelling properties of the hydrogel are lost or lowered, and if the addition amount exceeds 45 wt %, there may be a problem in which a hydrogel having very strong networking and a remarkably low water absorption ability may be produced.

On the other hand, the hydrogel according to an embodiment of the present disclosure may be in the form of a dried hydrogel film, or may also be provided by impregnating the film-form hydrogel with a solution such as a drug, a cosmetic composition, or the like.

The use of the hydrogel is not particularly limited, and may be used for cosmetics or drug delivery, and in detail, may be used for drug delivery.

On the other hand, according to an embodiment of the present disclosure, a method for preparing a hydrogel is provided.

In detail, according to an exemplary embodiment of the present disclosure, a method for preparing a hydrogel for drug delivery includes irradiating chitosan with radiation; mixing radiated chitosan, a natural gelling polymer, and a hydrophilic synthetic polymer with a solvent; and adding (3-mercaptopropyl)trimethoxysilane (MPTMS) to the solvent.

A more detailed description of the radiated chitosan, natural gelling polymer, hydrophilic synthetic polymer, and (3-mercaptopropyl) trimethoxysilane (MPTMS) is already provided in the aforementioned hydrogel for drug delivery, and thus, will be omitted below.

On the other hand, the operation of mixing radiated chitosan, a natural gelling polymer, and a hydrophilic synthetic polymer with a solvent may be performed as a single operation, or may be performed by sequential mixing with a solvent, and the mixing order and method are not particularly limited.

On the other hand, the radiation may be X-rays, gamma rays, or electron rays, but is not limited thereto, and in detail, the molecular weight of chitosan may be reduced by using gamma rays.

Further, the radiation may be irradiated at a total dose of 10 to 30 kGy, in detail, at a total dose of 15 to 25 kGy. If the total dose of the irradiated radiation is less than 10 kGy, the molecular weight of chitosan may not be sufficiently lowered, and a problem in producing a hydrogel may be caused due to high viscosity or the like. If radiation is irradiated with a dose exceeding 30 kGy, since the molecular weight of the chitosan is remarkably lowered, a problem in which it is difficult to exhibit the physicochemical advantages (viscosity, solubility, or the like) of chitosan may occur.

On the other hand, water may be used as the solvent, and further, an acid may be added to the solvent to dissolve chitosan more smoothly, for example, acetic acid may be added, and in detail, 0.5 to 2 M aqueous acetic acid solution may be used. When a solvent in the above range is used, chitosan may be easily decomposed into the molecular weight range of the present disclosure.

Furthermore, when the hydrogel according to an embodiment of the present disclosure is used for drug delivery, the method for preparing a hydrogel may further include adding at least one selected from the group consisting of a drug and a radioisotope to the solvent, for example, may further include adding a drug to be delivered, to the solvent before adding MPTMS. In this case, the kind of the drug is not particularly limited, but for example, may be at least one selected from the group consisting of ampicillin and kanamycin monosulfate monohydrate, in detail, may be ampicillin. The radioisotope may be, for example, radioactive iodine or the like, for example, I-131, I-125, Tc-99m, Zr-89, In-111, Sr-90, etc.

On the other hand, alternatively, when the hydrogel according to an embodiment of the present disclosure is used for drug delivery, at least one selected from the group consisting of drugs and radioisotopes is not added to the solvent, and after producing a hydrogel first, at least one selected from the group consisting of a drug and radioisotope may be added, thereby preparing the hydrogel.

In the method for preparing a hydrogel according to an embodiment of the present disclosure, after all the components are mixed, for example, subsequently to the operation of adding MPTMS, and/or subsequently to the operation of adding at least one selected from the group consisting of a drug and radioisotope, an operation of uniformly mixing and drying a solution may be further included. In this case, the drying may be performed at 40 to 50° C. for 2 to 4 hours. The drying method is not particularly limited, but may be performed by, for example, hot air drying, oven drying, freeze drying, or the like.

Hereinafter, the present disclosure will be described in more detail through detailed examples. The following examples are only examples to aid understanding of the present disclosure, and the scope of the present disclosure is not limited thereto.

MODE FOR INVENTION

Example

To prepare a hydrogel for drug delivery according to an embodiment of the present disclosure, the following materials were prepared.

Chitosan (Mw: 31.00-37.5×10$^4$ g/mol, 800-2000 cP, >75% deacetylated), as a natural gelling polymer, guar gum (food grade extra refined, 500 cP) were used, and as a hydrophilic synthetic polymer, polyvinyl pyrrolidone (PVP, Mw: 40,000 g/mol) was used, and all were purchased from Sigma Aldrich (Yongin, Seoul). (3-mercaptopropyl) trimethoxysilane (MPTMS) was used with 95% purity, and was purchased from Sigma Aldrich-USA. KCl, NaCl, $CaCl_2$, monopotassium phosphate ($KH_2PO_4$), sodium acetate, and NaOH used were all purchased from Merck-Germany. Gram-positive *Staphylococcus aureus* (*S. aureus*), yeast extract and tryptophan were used for antibacterial analysis. Ampicillin sodium was supplied from Duchefa Biochemie-Netherlands. Acetic acid (≥99.7), methanol, hydrochloric acid, and boric acid were manufactured by Daejung Chemical & Metals Co. Ltd., Siheung, South Korea.

Examples 1 to 3

Gamma rays were irradiated to chitosan prepared at a dose of 1.02 kGy/h in an air atmosphere so as to give a total dose of 20 kGy, using a $^{60}$Co gamma irradiation device (150 TBq capacity, ACEL, MDS Nordion, Canada) at Korea Atomic Energy Research Institute (Jeongeup, Korea).

After gamma irradiation, in 0.5M aqueous acetic acid solution, chitosan irradiated with radiation was mixed at a concentration of 2 w/v % and mixed on a hot plate at 15-30° C. for 12 hours. Impurities were removed using a filter (Mira-cloth, Calbiochem Novabiochem Corp., San Diego, CA) to prepare an aqueous chitosan solution.

Guar gum was added to distilled water at 60° C. to prepare a 1 w/v % of guar gum aqueous solution, and PVP was added to distilled water at 45° C. to prepare a 1 w/v % of PVP aqueous solution.

The aqueous chitosan solution, guar gum aqueous solution, and PVP aqueous solution were mixed in a volume ratio of 3:1:0.5, so that a total of 45 mL was obtained. At this time, the chitosan solution and the guar gum aqueous solution were first mixed at 50° C. for 2 hours, and then PVP was added and mixed again at 50° C. for 2 hours.

Then, 200 µl (Example 1), 400 µl (Example 2) and 500 µl (Example 3) of MPTMS were added and mixed as a cross-linking agent.

A solution in which radiated chitosan, guar gum, PVP and MPTMS were all mixed was filled into a Petri dish, and was dried using a desiccator at room temperature (25° C.) and 20% relative humidity. As a result, a hydrogel was produced.

Figure 1:
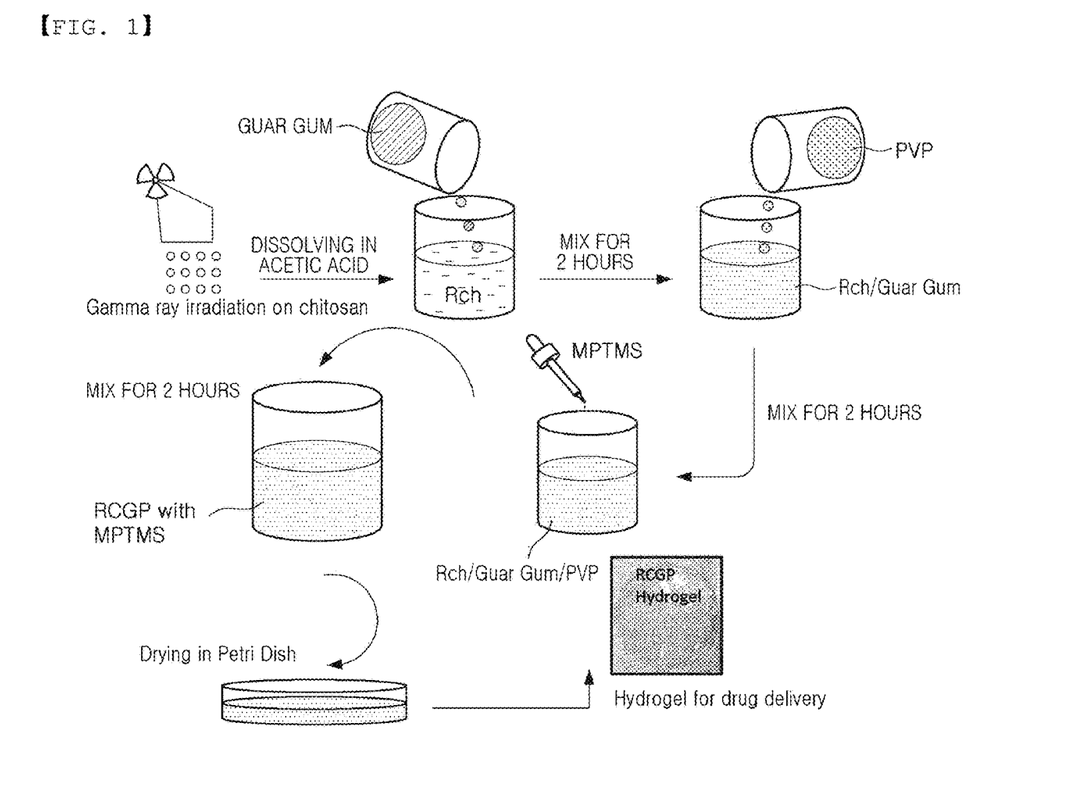
FIG. 1 schematically illustrates a method for preparing a hydrogel according to an embodiment of the present disclosure.

The producing method as described above is briefly illustrated in FIG. 1.

Comparative Example 1

A hydrogel was prepared in the same manner as in Example 1, except that MPTMS was not added and the hydrogel was prepared with a mixture of radiated chitosan, guar gum and PVP.

The components and contents of the hydrogels prepared in Examples 1 to 3 and Comparative Example 1 are summarized in Table 1.

TABLE 1

| Number | Chitosan (g) (weight %) | Guar Gum (g) (weight %) | PVP (g) (weight %) | MPTMS (g) (weight %) |
|---|---|---|---|---|
| Comparative Example 1 | 0.6 (80) | 0.1 (13.3) | 0.05 (6.7) | |
| Example 1 | 0.6 (63.2) | 0.1 (10.5) | 0.05 (5.3) | |
| Example 2 | 0.6 (52.2) | 0.1 (8.7) | 0.05 (4.3) | 0.4 (34.8) |
| Example 3 | 0.6 (48) | 0.1 (8) | 0.05 (4) | 0.5 (40) |

Experimental Example (1) Fourier Transform Infrared Spectroscopy (FTIR) Analysis To check whether MPTMS was mixed with the hydrogels of Examples 1 to 3, FTIR analysis was performed.

FTIR analysis was performed using an iS10 (Thermo Fisher Scientific) spectrometer, and each spectrum was taken at a scanning range and resolution of 4000-750 cm$^{-1}$ and 4 cm$^{-1}$, respectively. The results are illustrated in FIG. 2.

Figure 2:
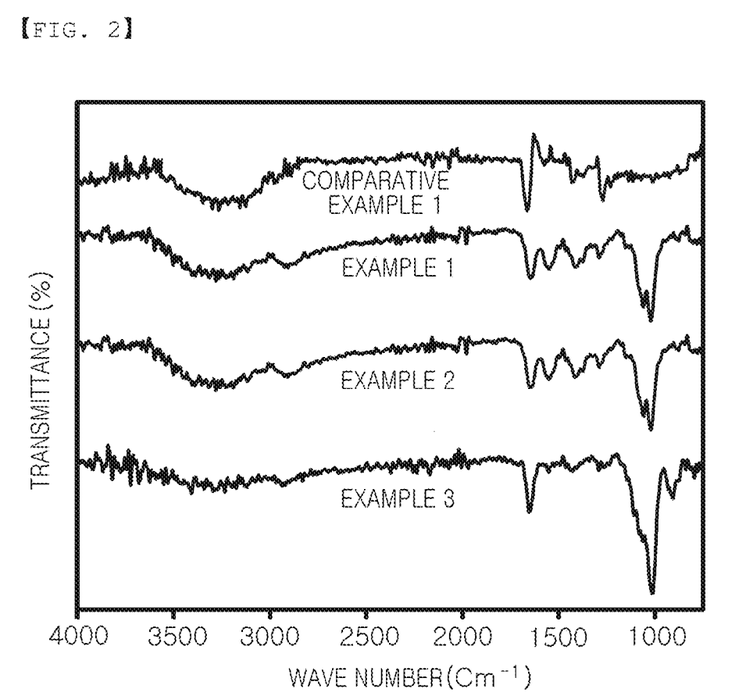
FIG. 2 illustrates the results of FTIR analysis of a hydrogel according to an embodiment of the present disclosure.

As a result, as illustrated in FIG. 2, stretching vibration due to internal and external hydroxyl groups present in the hydrogel could be observed at 3540-3140 cm$^{-1}$, and the presence of chitosan and guar gum due to the saccharin structure at 1152 cm$^{-1}$ and the pyranose ring at 890 cm$^{-1}$ could be confirmed. In addition, characteristic bands of chitosan were observed at 1300 cm$^{-1}$ by cis-amide III and at 1575 and 1640 cm$^{-1}$ by the bond of amide I and amide II. The stretching bands of 1250 and 1110 cm$^{-1}$ are due to the cyclic and acyclic —C—O—C bonds of chitosan, guar gum and PVP. Sharp stretching bands of 1120 and 1010 cm$^{-1}$ were observed, which was due to the —Si—O—Si— and —Si—O—C— bonds of the hydrogel formed by crosslinking by a crosslinking agent. In Examples 1 to 3, the increase in the concentration of the MPTMS crosslinking agent in the hydrogel indicated an increase in the band strength, from which the crosslinking between chitosan, guar gum and PVP could be confirmed.

(2) Swelling Test

[Experiment of Swelling for Distilled Water]

The swelling behavior of Examples 1 to 3 and Comparative Example 1 were tested in distilled water. Distilled water was poured so that the hydrogel (pre-weighed) in the Petri dish was completely submerged in distilled water. Thereafter, distilled water was removed at intervals of 10 minutes, and the Petri dish was dried with tissue paper. Then, the Petri dish weighed together with the swollen hydrogel was placed on an analytical balance, and the nearest mg value was recorded. The swelling value was calculated by the following equation.

Swelling (g/g)=($W_s$−$W_d$)/($W_d$) (where $W_s$ represents swollen hydrogel and $W_d$ represents dried hydrogel)

This experiment was continued until the weight of the swollen hydrogel begun to decrease, and just before the weight of the swollen hydrogel began to decrease is a maximum swelling limit of the produced hydrogel.

Figure 3:
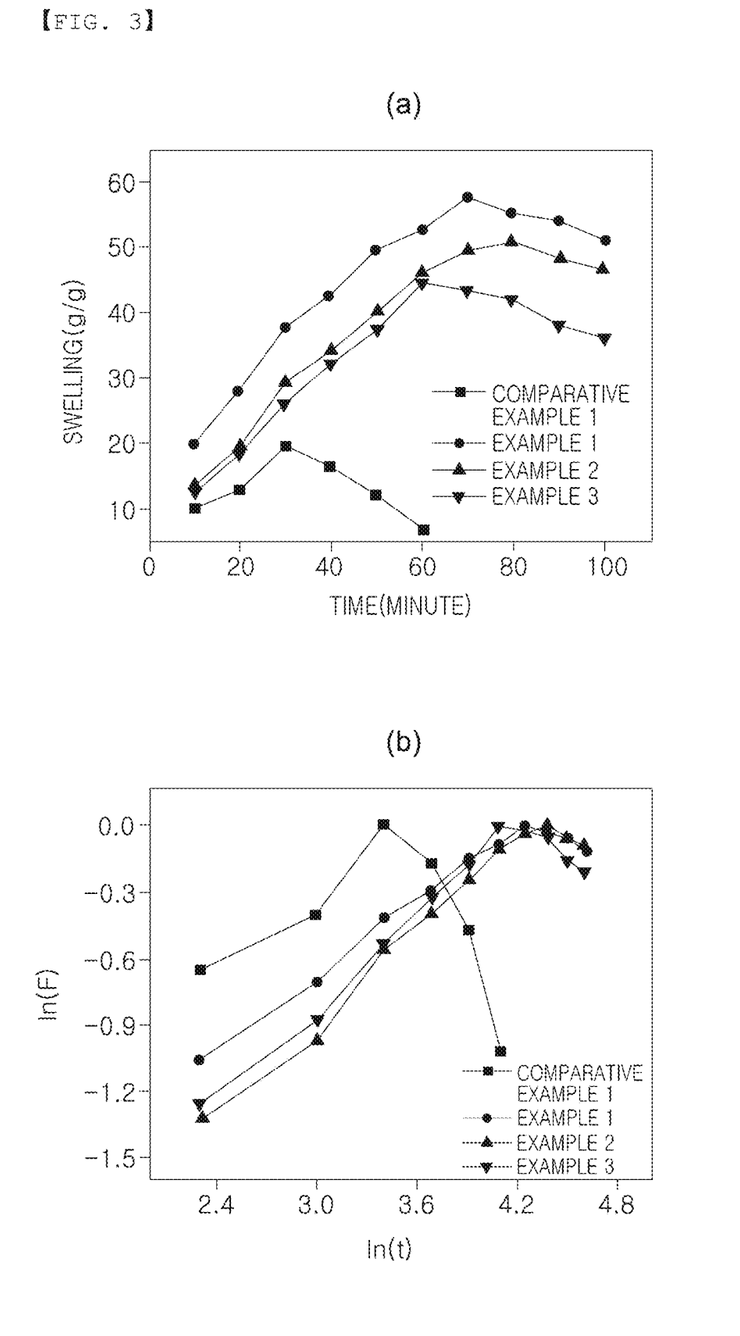
FIG. 3 illustrates the results of measuring the swelling properties of a hydrogel in distilled water according to an embodiment of the present disclosure.

As a result, as illustrated in FIG. 3, it was confirmed that the minimum swelling (g/g) was observed in the hydrogel of Comparative Example 1 (19.33 g/g) while the swelling (g/g) (57.4 g/g) was observed in Example 1. In addition, it was confirmed that Examples 1, 2, and 3 have superior swelling properties compared to Comparative Example 1.

On the other hand, since the swelling properties of the hydrogel occur due to the water diffusion mechanism, which may be calculated by the following equation.

F=kt$^n$ (where n represents the swelling index (exponent), k is the swelling rate constant, and F is the fractional swelling determined by the ratio of Wt (swelling ratio at instant t) and $W_{eq}$ (representing the equilibrium time of swelling))

A graph of ln(F) versus ln(t) of the F is illustrated in FIG. 2B (the plot of ln (F) versus ln (t)), and the diffusion parameter values are summarized in Table 2 below.

TABLE 2

| Parameter | Comparative Example 1 | Example 1 | Example 2 | Example 3 |
|---|---|---|---|---|
| n | 0.57 | 0.55 | 0.68 | 0.69 |
| Y Intercept | −2.016 | −2.347 | −2.864 | −2.961 |
| K | 0.133 | 0.096 | 0.057 | 0.052 |
| Regression (%) | 86 | 99 | 98 | 98 |

In this case, when the swelling index n is 0.5 or less, the diffusion pattern is Fickian, when the swelling index n is greater than 0.5, the diffusion pattern is non-Fickian, and when n is 1, it indicates the release mechanism of Case II.

As illustrated in Table 2, it was confirmed that the hydrogels of Examples 1 to 3 exhibit a greater n value than that of the hydrogel of Comparative Example 1, which indicates that the hydrogels of Examples 1 to 3 have higher water absorption capacity.

[Experiment of Swelling by pH]

The swelling properties of the hydrogels obtained in Examples 1 to 3 and Comparative Example 1 were measured according to pH. The swelling properties of the hydrogels of Examples and Comparative Examples were measured in buffer solutions having pH of 2, 4, 6, 7, 8, and 10.

Figure 4:
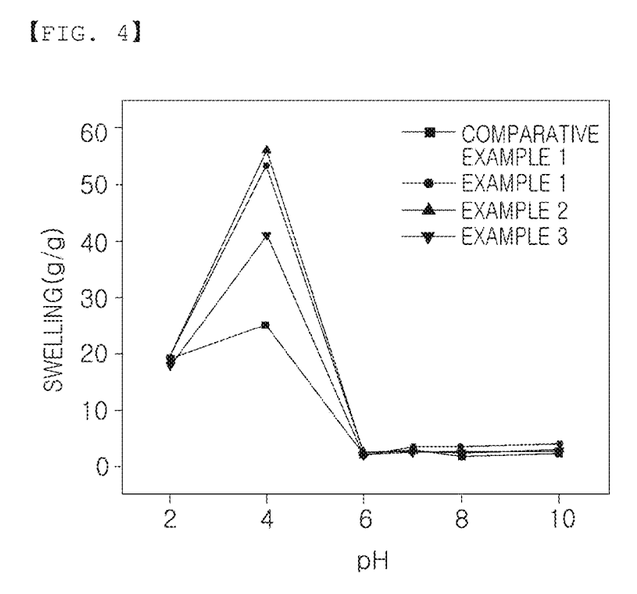
FIG. 4 illustrates the results of measuring the swelling properties of a hydrogel according to the pH according to an embodiment of the present disclosure.

The results are illustrated in FIG. 4, and as illustrated in FIG. 4, it was confirmed that the hydrogel exhibited minimal swelling at neutral and basic pH, while the maximum swelling occurred at acidic pH. The hydrogel of Comparative Example 1 showed less swelling at acidic pH (2 to 6) compared to the hydrogels of Examples 1 to 3 at the same pH. The hydrogel of Example 2 at pH 4 showed maximum swelling (55.73 g/g). Cationic polymer-based hydrogel such as chitosan may exhibit maximum swelling at acidic pH due to protonation of amino (—NH$^{2+}$) groups and repulsion of protonated charged entities. Deprotonation of the amino (—NH$^{2+}$) group at a higher pH level may be the cause of the reduced swelling of the produced hydrogel. Thus, less swelling is observed at neutral and basic pH due to deswelling at higher pH.

When the pKb in each experiment is greater than the pH of the surrounding medium, protonation occurs, thereby improving the amount of cations on the polymer chain. Accordingly, hydrophilicity generated by irradiation of chitosan and swelling due to repulsion of the chain occur.

[Experiment of Swelling by Ion]

Since swelling properties may vary depending on the concentration of the salt, the swelling properties of the hydrogels of Examples 1 to 3 and Comparative Example 1 hydrogels were measured in a solution containing NaCl and CaCl$_2$ salts. The results are illustrated in FIG. 5.

Figure 5:
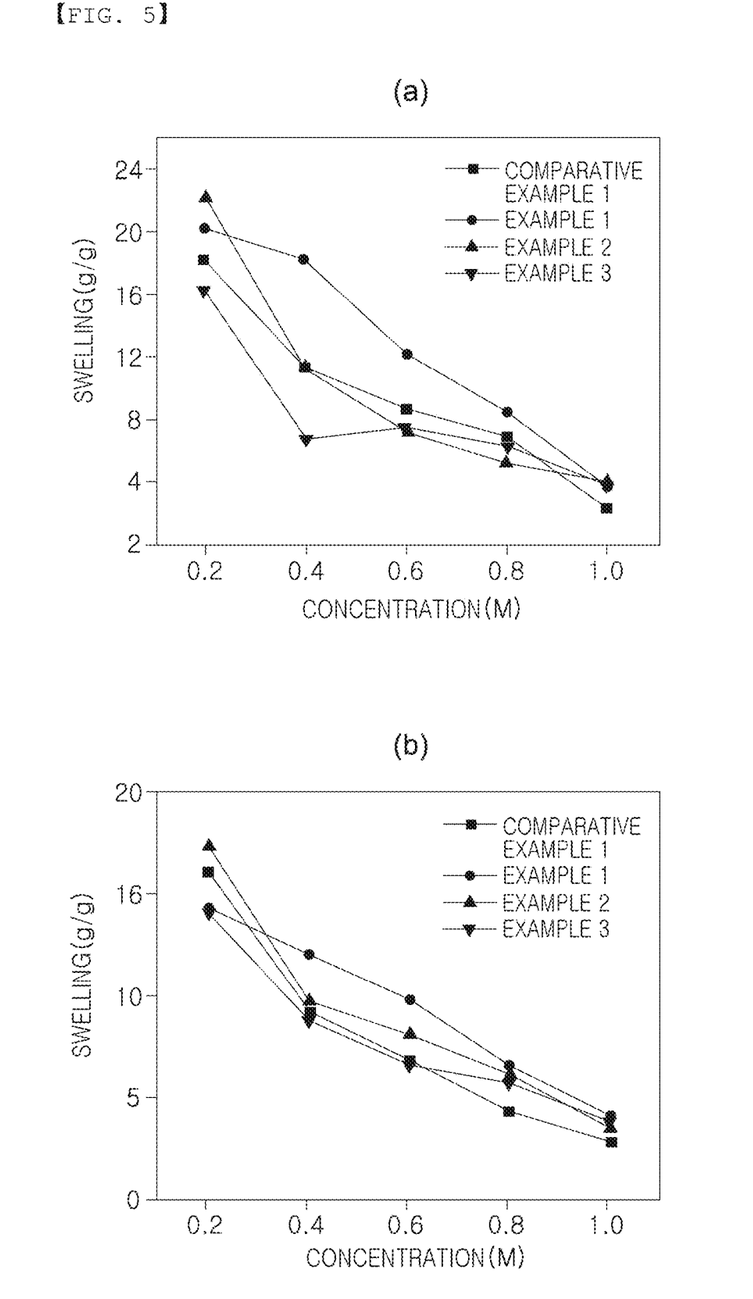
FIG. 5 illustrates the results of measuring the swelling properties of a hydrogel according to the concentration of an ionic solution (NaCl in FIG. 5A, $CaCl_2$ in FIG. 5B) according to an embodiment of the present disclosure.

As illustrated in FIG. 5, as the concentration of NaCl and CaCl$_2$ in the ionic solution increased, the swelling properties of the hydrogel decreased. A large amount of electrolyte reduced the osmotic pressure between the hydrogel and the external solvent, and generated a charge screening effect. For this reason, a decrease in diffusion occurred and the swelling properties decreased. As illustrated in FIG. 5A, the maximum expansion value was measured as 22.18 g/g in the case of 0.2M NaCl (FIG. 5A) and measured as 17.18 g/g in the case of 0.2M $CaCl_2$ (FIG. 5B).

On the other hand, in the case of the $CaCl_2$ electrolyte ion solution, greater swelling occurred compared to the NaCl electrolyte ion solution of the same concentration. The $Ca^{2+}$ cations form complexes with the polymer, which appears to be due to an increase in pore size at low concentrations of $CaCl_2$ resulting in a greater swelling value.

(3) Biodegradation Measurement

To measure biodegradability, 35 mg of hydrogels from Examples 1 to 3 and Comparative Example 1, respectively, were immersed in PBS, and each hydrogel was extracted after 1, 3, 5 and 7 days, and the weight thereof was accurately measured. The weight reduction rate (%) was calculated by subtracting the initial weight from the final weight, and the results are illustrated in FIG. 6.

Figure 6:
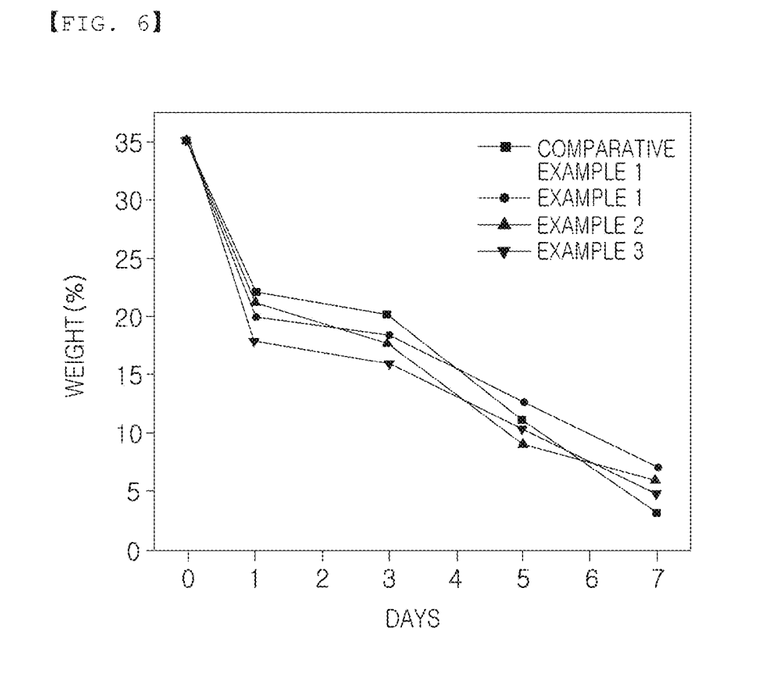
FIG. 6 illustrates the results of measuring the biodegradability of a hydrogel according to an embodiment of the present disclosure.

As illustrated in FIG. 6, it could be confirmed that after 7 days, the hydrogels were gradually decomposed over time. In detail, it was confirmed that 91.15% of the hydrogel of Comparative Example 1 was decomposed, 79.84% of the hydrogel of Example 1, 83.45% of the hydrogel of Example 2, and 86.34% of the hydrogel of Example 3 were decomposed.

On the other hand, monomeric units of chitosan consist of a glycosidic linkage, which is responsible for hydrogel biodegradation, but it was confirmed that the mixed use of chitosan, guar gum and PVP with MPTMS reduced weight loss due to the interaction of natural and synthetic polymers, and in detail, the biodegradability was lowest when MPTMS was used in the same content as in Example 1.

(4) Antibacterial Analysis

The antibacterial activity of the hydrogels of Examples 1 to 3 and Comparative Example 1 was analyzed by the well and disk diffusion method.

100 µl ($10^8$ cells/ml) log phase culture of *Salmonella typhimurium* (Gram-negative) and *Listeria monocytogenes* (Gram-positive) was inoculated aseptically on Luria Bertani (LB) agar plates by spread plate technology. Thereafter, a well (6-8 mm) was prepared on an LB agar plate using a sterile cork borer, and 100 µl of the prepared hydrogels of Examples 1 to 3 and Comparative Example 1 were aseptically inoculated into the wells.

Figure 7:
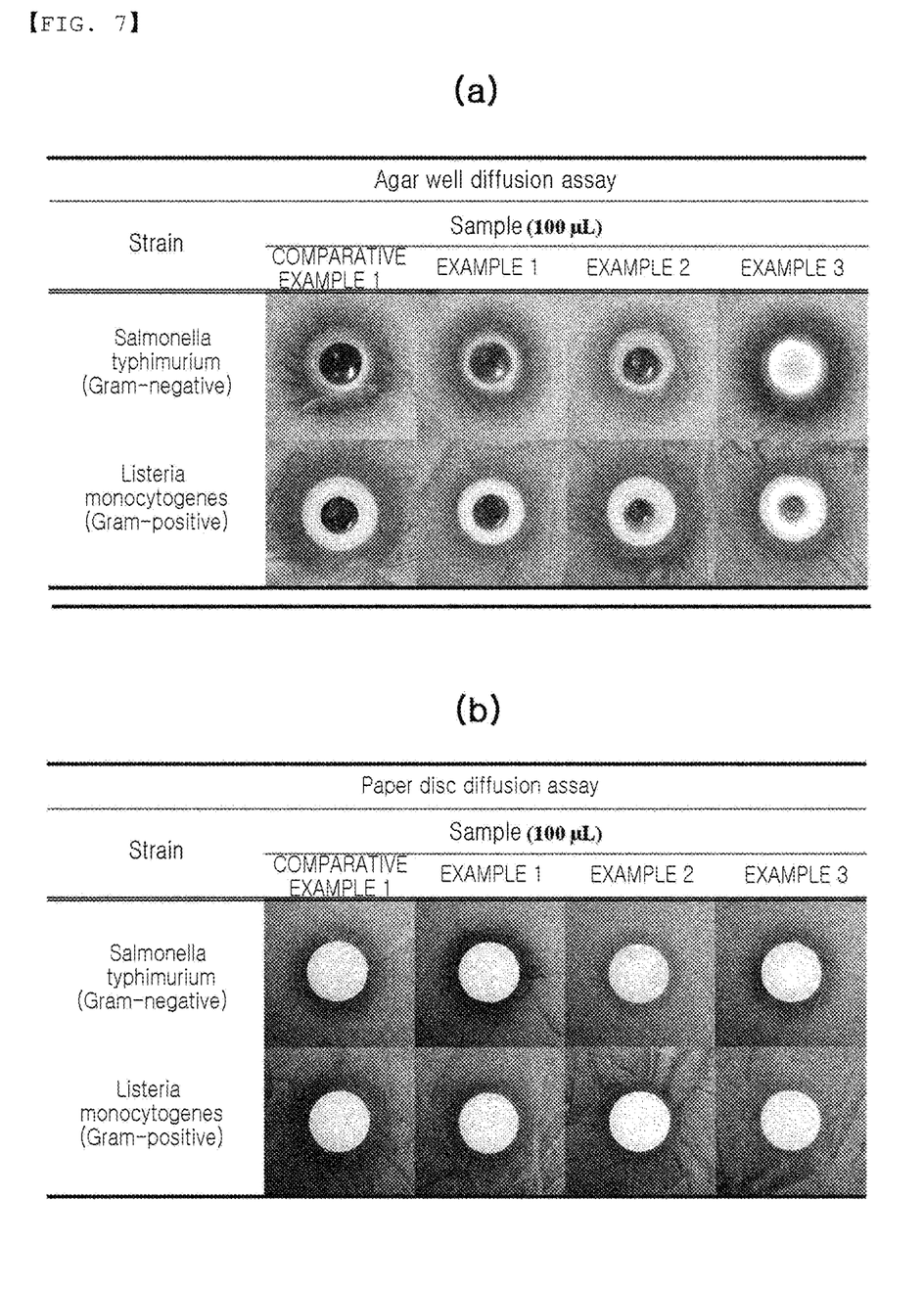
FIG. 7 illustrates an analysis of antibacterial properties of a hydrogel according to an embodiment of the present disclosure, by a well and disk diffusion method, and illustrates an image of visual observation of a suppressed area around the well and disk.

On the other hand, for the disc diffusion analysis, a sterilized filter disc (6 mm) was placed on the surface of an LB agar plate, and 100 µl of the prepared hydrogels of Examples 1 to 3 and Comparative Example 1 were aseptically inoculated on the surface of the paper disc. This is illustrated in FIG. 7.

The plate was incubated at 28° C. for 24 hours overnight, and the region of inhibition around the well and disks was observed, and the results are illustrated in Table 3.

TABLE 3

| Strain | Sample (100 µl) | | | |
|---|---|---|---|---|
| | Comparative Example 1 | Example 1 | Example 2 | Example 3 |
| | Agar well diffusion assay | | | |
| *Salmonella typhimorium* (gram negative) | ++ | ++ | ++ | +++ |
| *Listeria monocytogen* (gram positive) | +++ | ++ | +++ | ++ |
| | Paper disc diffusion assay | | | |
| *Salmonella typhimorium* (gram negative) | ++ | ++ | + | + |
| *Listeria monocytogen* (gram positive) | ++ | ++ | + | + |

\* Diameter of inhibitory region: ±: 0-3 mm ; +: 3-6 mm; ++: 6-9 mm; +++: more than 12 mm All hydrogels exhibited some activity against both Gram-positive and Gram-negative bacterial strains, as illustrated in FIG. 7 and Table 3 above.

In detail, a clear inhibitory region was observed in the agar well diffusion method. The region exceeding 12 mm was provided for *Listeria monocytogen* by the hydrogel of Comparative Example 1 and the hydrogel of Example 2. In addition, a region of inhibition exceeding 12 mm for *Salmonella typhimurium* was observed by the hydrogel of Example 3. On the other hand, in the agar disk diffusion method, an inhibitory region was observed in all hydrogels, but no hydrogel exceeded 9 mm.

On the other hand, a minimal inhibitory concentration (MIC) of the hydrogels of Examples 1 to 3 and Comparative Example 1 was determined by broth dilution. 20 µl of bacterial culture was aseptically inoculated into LB media (2 mL) supplemented with different concentrations of the hydrogels of Examples 1-3 and Comparative Example 1. The tube was incubated at 28° C. for 24 hours with an orbital shaker (180 rpm). Furthermore, a medium not inoculated with the hydrogel was used as a control.

After incubation, 0.1 mL of sample was serially diluted, plated on LB agar plates by spread plate technique, incubated at 28° C. for 2 hours, and observed for the colony forming unit. The results are illustrated in Table 4.

TABLE 4

| Dilution Ratio | Comparative Example 1 | Example 1 | Example 2 | Example 3 |
|---|---|---|---|---|
| | *Salmonella typhimorium*, Gram negative (CFU/mL) | | | |
| 1/256 | 4.5 ± 0.1 × $10^6$ | 4.0 ± 0.1 × $10^6$ | 3.1 ± 0.6 × $10^6$ | 3.5 ± 0.0 × $10^6$ |
| 1/128 | 9.3 ± 0.1 × $10^5$ | 6.3 ± 0.4 × $10^5$ | 6.8 ± 0.3 × $10^5$ | 4.9 ± 0.6 × $10^5$ |
| 1/64 | 4.3 ± 0.0 × $10^5$ | 2.8 ± 0.0 × $10^5$ | 3.7 ± 0.2 × $10^5$ | 4.1 ± 0.2 × $10^5$ |
| 1/32 | 6.8 ± 0.1 × $10^4$ | 4.1 ± 0.1 × $10^4$ | 2.3 ± 0.1 × $10^4$ | 2.0 ± 0.3 × $10^4$ |
| 1/16 | 1.7 ± 0.0 × $10^2$ | 0.5 ± 0.0 × $10^2$ | 0.2 ± 0.0 × $10^2$ | 0.3 ± 0.0 × $10^2$ |
| 1/8 | 3.0 ± 0.0 | 2.0 ± 1.0 | N.D. | N.D. |
| 1/4 | N.D. | N.D. | N.D. | N.D. |
| 1/2 | N.D. | N.D. | N.D. | N.D. |
| 1 | N.D. | N.D . | N.D. | N.D. |
| Control | 9.7 ± 0.4 × $10^6$ | | | |
| | *Listeria monocytogen*, Gram positive (CFU/mL) | | | |
| 1/256 | 6.5 ± 0.1 × $10^5$ | 5.8 ± 0.4 × $10^5$ | 7.5 ± 0.6 × $10^5$ | 4.7 ± 0.3 × $10^5$ |
| 1/128 | 3.8 ± 0.3 × $10^5$ | 4.1 ± 0.1 × $10^5$ | 3.5 ± 0.0 × $10^5$ | 2.7 ± 0.4 × $10^5$ |

TABLE 4-continued

| Dilution Ratio | Comparative Example 1 | Example 1 | Example 2 | Example 3 |
|---|---|---|---|---|
| 1/64 | $1.9 \pm 0.0 \times 10^4$ | $1.3 \pm 0.1 \times 10^4$ | $1.3 \pm 0.0 \times 10^4$ | $1.0 \pm 0.0 \times 10^4$ |
| 1/32 | $8.6 \pm 0.1 \times 10^3$ | $5.0 \pm 0.1 \times 10^3$ | $4.3 \pm 0.1 \times 10^3$ | $3.3 \pm 0.1 \times 10^3$ |
| 1/16 | N.D. | N.D. | N.D. | N.D. |
| 1/8 | N.D. | N.D. | N.D. | N.D. |
| 1/4 | N.D. | N.D. | N.D. | N.D. |
| 1/2 | N.D. | N.D. | N.D. | N.D. |
| 1 | N.D. | N.D. | N.D. | N.D. |
| Control | | | | $1.0 \pm 0.0 \times 10^6$ |

*The dilution ratio indicating N.D. (No Data) at which colony-forming units begin to be observed is the Minimal Bacterial Concentration (MBC). The viability of the hydrogel was observed by counting the CFU in the diluted hydrogel sample. At a dilution of 1/16, the bacterial count was found to be 0, and thereafter, as illustrated in Table 4, the bacterial count was increased in the bacterial strain and all hydrogels.

Figure 8:
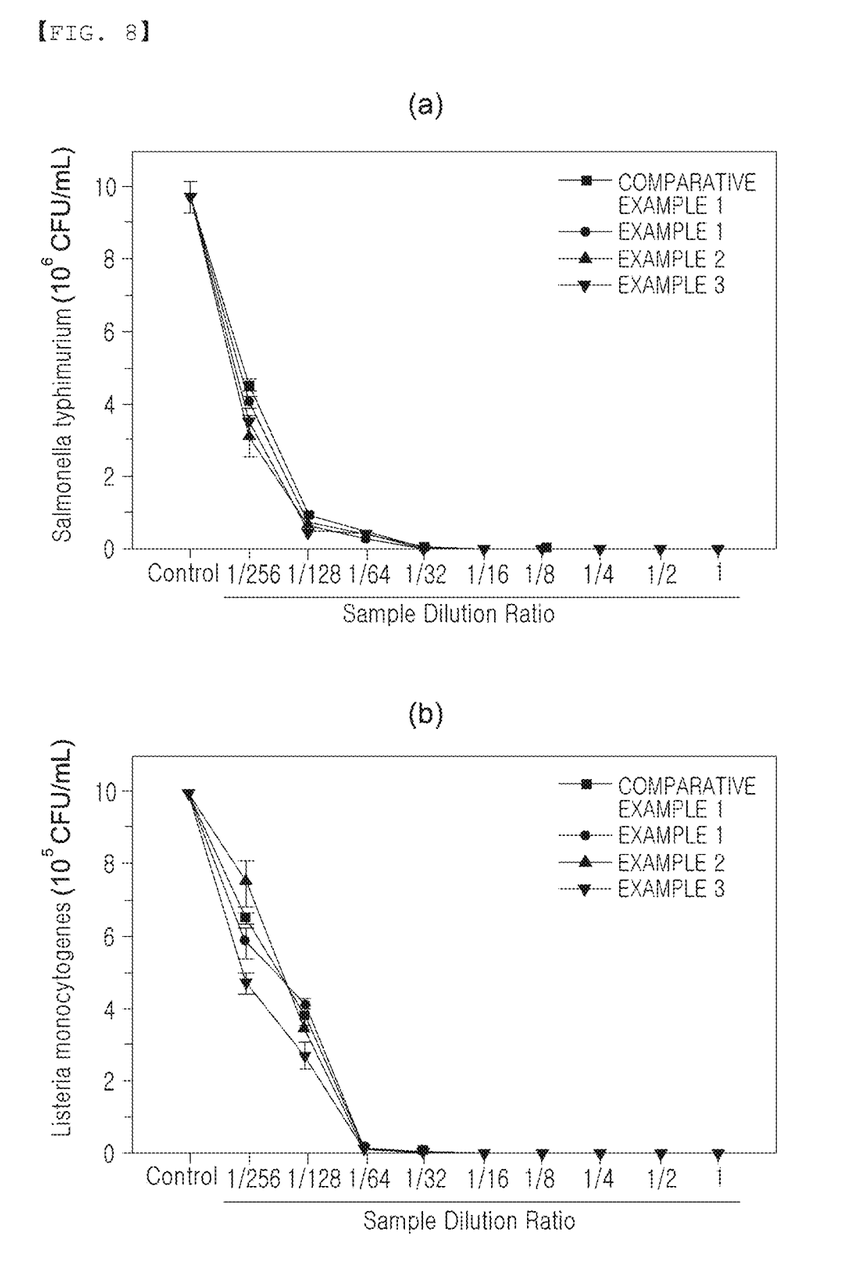
FIG. 8 illustrates a minimum inhibitory concentration (MIC) for *Salmonella typhimurium* (Gram-negative) and *Listeria monocytogenes* (Gram-positive) of a hydrogel according to an embodiment of the present disclosure.

The MICs of the hydrogels were different in the two bacterial strains. Both the hydrogels of Examples 1 and 2 were observed at 1/8, whereas for *Salmonella typhimurium*, both the hydrogels of Example 2 and 3 were 1/36. In *Listeria monocytogen*, the MIC of all hydrogels was observed at 1/32 of the original dilution, as illustrated in FIG. 8. The hydrogel according to an embodiment of the present disclosure exhibited improved antibacterial properties because the weight average molecular weight of chitosan was low, and the hydrogel entered bacterial cells to terminate the conversion of DNA to RNA, thereby delaying growth.

The mechanism of inhibition of bacterial growth is due to the binding of microbial DNA and chitosan, which leads to protein synthesis and impedance of mRNA by the penetration of chitosan into the microbial nucleus.

(5) Drug Release Ability Analysis
[Preparation of SIF, SGF and PBS]

To prepare a stimulated intestinal fluid (SIF) having a pH of 6.8, 118 mL of 0.1 M sodium hydroxide (NaOH) was added to 250 mL of 0.2 M monopotassium phosphate ($KH_2PO_4$). Further, to prepare a stimulated gastric fluid (SGF) having a pH of 1.2, 1 g of NaCl was mixed with 3.5 mL of hydrochloric acid (HCl), and diluted with distilled water until it becomes 500 mL. In addition, PBS of pH 7.4 was prepared.

[Preparation of Drug-Loaded Hydrogel]

As a drug, ampicillin sodium was used. 0.5 g of radiated chitosan was dissolved in 25 mL of 0.5 M aqueous acetic acid solution, and 25 mL of distilled water was added to prepare a chitosan solution. Further, an aqueous guar gum solution in which 0.2 g of guar gum was added to 25 mL of distilled water, and an aqueous PVP solution in which 0.5 g of PVP was added to 25 mL of distilled water, were prepared. The chitosan solution, guar gum solution, and PVP solution were mixed in a volume ratio of 3:1:0.5 at 45° C. for 2 hours. Thereafter, a drug solution prepared by adding 35 mg of the drug to 5 mL of distilled water was added to the mixed solution of the chitosan solution, guar gum solution, and PVP solution.

Then, to the solution to which the drug was added, an MPTMS solution in which 200 μl of MPTMS was mixed in 5 mL of methanol was added, for dissolution, and then, was mixed at 45° C. for 4 hours, transferred to a Petri dish, and dried overnight in a 40° C. drying oven (VS-1202D3, VISION Scientific Co., Ltd, Korea).

After drying, the prepared hydrogel was immersed in PBS, SIF and SGF, respectively, in a beaker at 37° C. for 3 hours. 5 mL of these solutions were extracted from the beaker every 30 minutes, and the same amount of solutions (PBS, SIF and SGF) were added back to the beaker to maintain the same volume of solution. As a reference sample, the aforementioned amount of drug including PBS and SIF without hydrogel was used. UV-Vis spectrophotometry was used to measure a drug release amount. The results are illustrated in FIG. 9.

Figure 9:
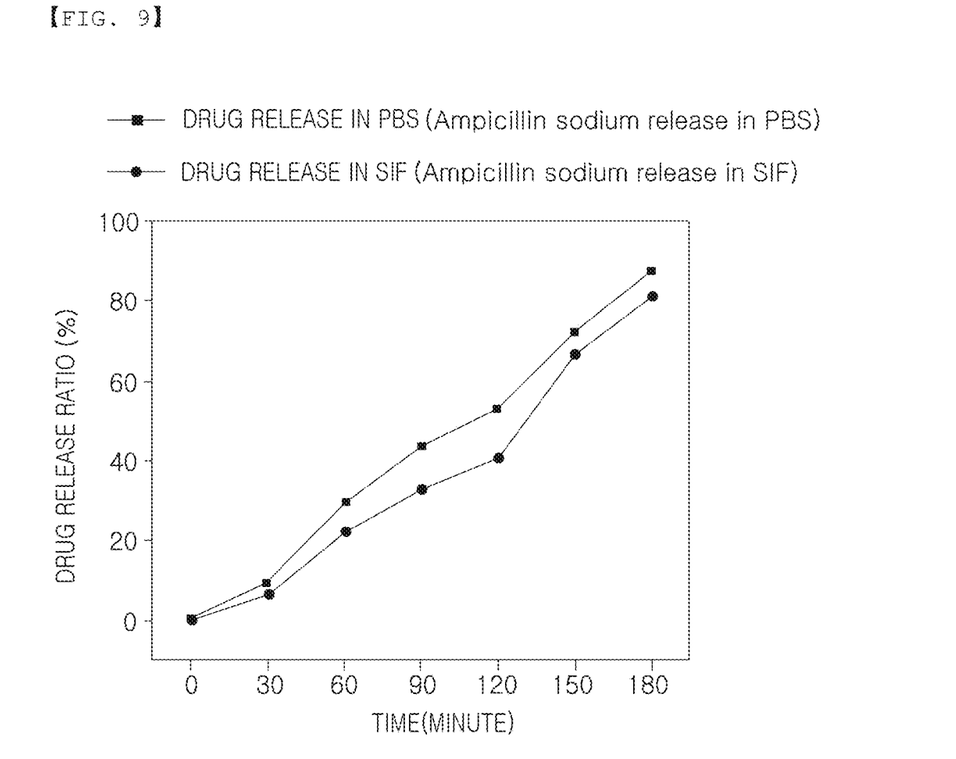
FIG. 9 illustrates the results of measuring drug release ability of a hydrogel according to an embodiment of the present disclosure.

As illustrated in FIG. 9, controlled drug release showed in SIF and PBS, 81.30% drug release showed in SIF and 87.40% drug release showed in PBS, for 180 minutes, which meets the US Pharmacopoeia standard requiring 80% or more drug release for 3 hours.

It was confirmed that the hydrogel according to an embodiment of the present disclosure is suitable for administration of injectable (intravenous, IV) drugs.

Although the embodiments of the present disclosure have been described in detail above, the scope of the present disclosure is not limited thereto, and various modifications and variations are possible without departing from the technical spirit of the present disclosure described in the claims, which will be obvious to those of ordinary skill in the art.

The invention claimed is:

1. A hydrogel for drug delivery comprising gamma ray radiated chitosan, a natural gelling polymer, a hydrophilic synthetic polymer, and (3-mercaptopropyl) trimethoxysilane,
    wherein the hydrogel comprises 40 to 80 wt % of the radiated chitosan, 5 to 15 wt % of the natural gelling polymer, 3 to 10 wt % of the hydrophilic synthetic polymer, and 20 to 40 wt % of the (3-mercaptopropyl) trimethoxysilane, based on the total weight of the hydrogel, and
    wherein the natural gelling polymer is guar gum, and the hydrophilic synthetic polymer is polyvinylpyrrolidone,
    wherein the radiated chitosan has a weight average molecular weight (Mw) of $19.00 \times 10^4$ to $21.50 \times 10^4$ Daltons.

2. The hydrogel of claim 1, wherein the hydrogel is in a form of a hydrogel film.

3. A method for preparing a hydrogel for drug delivery, comprising:
    irradiating chitosan with gamma ray radiation at a total dose of 10 to 20 kGy to prepare irradiated chitosan having a weight average molecular weight (Mw) of $19.00 \times 10^4$ to $21.50 \times 10^4$ Daltons;
    mixing radiated chitosan, a natural gelling polymer, and a hydrophilic synthetic polymer with a solvent; and
    adding (3-mercaptopropyl) trimethoxysilane to the solvent,
    wherein the hydrogel comprises 40 to 80 wt % of the radiated chitosan, 5 to 15 wt % of the natural gelling polymer, 3 to 10 wt % of the hydrophilic synthetic polymer, and 20 to 40 wt % of the (3-mercaptopropyl) trimethoxysilane, based on the total weight of the hydrogel.

4. The method of claim 3, wherein the solvent is water.

5. The method of claim 3, wherein the solvent is an aqueous acetic acid solution of 0.5 to 2 M.

6. The method of claim 3, further comprising adding at least one selected from the group consisting of a drug and a radioisotope to the solvent.

7. The method of claim 6, wherein the drug comprises at least one selected from the group consisting of ampicillin and kanamycin monosulfate monohydrate.

\* \* \* \* \*